(12) United States Patent
Westhoff et al.

(10) Patent No.: US 8,024,573 B2
(45) Date of Patent: Sep. 20, 2011

(54) METHOD FOR AUTHENTICATION OF ELEMENTS OF A GROUP

(75) Inventors: Dirk Westhoff, Heidelberg (DE); Joao Girao, Heidelberg (DE)

(73) Assignee: NEC Corporation, Tokyo (JP)

( * ) Notice: Subject to any disclaimer, the term of this patent is extended or adjusted under 35 U.S.C. 154(b) by 1047 days.

(21) Appl. No.: 11/242,851

(22) Filed: Oct. 5, 2005

(65) Prior Publication Data

US 2006/0075248 A1   Apr. 6, 2006

(30) Foreign Application Priority Data

Oct. 5, 2004   (DE) .......................... 10 2004 049 026

(51) Int. Cl.
  *G09C 1/10* (2006.01)
(52) U.S. Cl. .......... 713/179; 340/531; 341/155; 380/44; 713/168; 713/175; 726/1
(58) Field of Classification Search ........ 726/1; 380/44; 341/155; 340/531; 713/168, 175
  See application file for complete search history.

(56) References Cited

U.S. PATENT DOCUMENTS

| | | | | |
|---|---|---|---|---|
| 6,052,787 | A * | 4/2000 | Euchner et al. ................ | 726/1 |
| 6,683,553 | B1 * | 1/2004 | Pai ................................ | 341/155 |
| 7,119,676 | B1 * | 10/2006 | Silverstrim et al. ........... | 340/531 |
| 2002/0114453 | A1 * | 8/2002 | Bartholet et al. .............. | 380/44 |
| 2008/0276092 | A1 * | 11/2008 | Eberhardt et al. ............ | 713/175 |

FOREIGN PATENT DOCUMENTS

| | | |
|---|---|---|
| JP | 10-145369 | 5/1998 |
| JP | 2001-044987 | 2/2001 |
| JP | 2002-024652 | 1/2002 |
| JP | 2002-049589 | 2/2002 |
| JP | 2002-217888 | 8/2002 |
| JP | 2004-199113 | 7/2004 |

OTHER PUBLICATIONS

Lamport, L. "Password Authentication with Insecure Communication." Published in Communications of the ACM. 24(11). Nov. 1981.*
Rcf2040 "The RC5, RC5-CBC, RC5-CBC-Pad, and RC5-CTS Algorithms" pp. 1-29, Oct. 1996).
E. Mykeletun, M. Narashimha, and G. Tsudik "Signature Bouquets: Immutability for Aggregated/Condensed Signatures" European Symposium on Research in Computer Security (ESORICS'04), Sep. 2004.
A. J. Menezes, et al., Handbook of Applied Cryptography, CRC Press, 1997, pp. 395-397.
Japanese Office Action dated May 11, 2011 in corresponding Japanese Application No. 2005-239304 with English translation of enclosed wavy line portions.

* cited by examiner

*Primary Examiner* — Vivek Srivastava
*Assistant Examiner* — Kevin Richards
(74) *Attorney, Agent, or Firm* — Young & Thompson

(57) ABSTRACT

A method for authentication of elements of a group, especially for authentication of sensor nodes in a preferably wireless sensor network is disclosed. The group has one specific element—leading element—with which each of the group elements can exchange information and wherein the authentication of the group elements takes place with regard to the leading element. The leading element sends an authentication request to the group elements wherein the authentication request is the same for all the group elements. The group elements each send authentication responses—based on the authentication request—to the leading element, with the authentication responses being different for each group element.

9 Claims, 2 Drawing Sheets

METHOD FOR AUTHENTICATION OF ELEMENTS OF A GROUP

BACKGROUND OF THE INVENTION

1. Field of the Invention

The present invention relates to a method for authentication of elements of a group, and in particular to a method for authentication of sensor nodes in a preferably wireless sensor network, wherein the group has one specific element—leading element—with which each of the elements of the group can exchange information and wherein the authentication of the elements of the group takes place with regard to the leading element.

2. Description of the Related Art

In practice, different methods of authentication have been known for a long time. Authentication in these cases serves for proving the identity and is meant to prevent that non-authorized entities are able to produce information that is only supposed to be generated by a defined group. In order to prove its authorization, one party has to prove specific characteristics to a second party within the authentication process. Once the necessary proof is given, i.e. the authentication process was successful, the party identified to be authorized can be allowed to have access to information which is not publicly accessible.

In particular, in wireless sensor networks (WSN) efficient authentication processes are of outstanding importance, for example to secure a reliable collection of information. Due to some specific characteristics of such networks, authentication within networks is also a big challenge.

Sensor networks generally comprise a big number, of sensor nodes that serve for example for collecting environmental data. Sensor networks can, for example, be used to measure humidity in vineyards or temperature on surfaces or to create movement patterns etc. All the individual sensors of a sensor network, which communicate with each other in a wireless way, consist in general of a probe, a processing unit, a communication device and a battery. The sensor nodes are usually produced in miniature size, so the functionalities of data collection, communication and computation are combined in a minimum amount of space. The limits of their transceiver, processor power, battery capacity, existing storage space or similar physically defined factors are therefore often very critical parameters for a sensor node. Due to these physical restrictions the methods used for authentication of sensor nodes must meet specific requirements.

Even though multiple solutions for one-to-one authentications are already known, these solutions cannot be directly applied in an environment in which the elements of the group have such restricted capabilities, as it is the case with sensor nodes. Facing the fact that big sensor networks have to organize themselves in a decentralized way, it can be observed that often cluster-based mechanisms are used. Hence, for such topologies, where a leading element (a so-called cluster-leader or dealer) is able to authenticate elements of the group, group authentication schemes are needed.

In practice, there are also different methods for group authentication already known. Purely symmetric schemes, characterized in that they are based on one single group key, are highly efficient, but are troublesome in the sense that they do not allow pairwise authentication. See rcf2040 "The RC5, RC5-CBC, RC5-CBC-Pad, and RC5-CTS Algorithms" pp. 1-29, October 1996). This disadvantage can basically be met by using asymmetric schemes. Asymmetric schemes, though, are in many ways problematic regarding the enormous computation effort, as the latter often exceeds the capacities that are in general available in, for example, ad hoc- or sensor networks. See E. Mykeletun, M. Narashimha, and G. Tsudik "Signature Bouquets: Immutability for Aggregated/Condensed Signatures" European Symposium on Research in Computer Security (ESORICS'04), September 2004.

SUMMARY OF THE INVENTION

The present invention is therefore based on the task of designing and further developing a method for authentication of elements of a group of the above captured kind, which allows a pairwise unilateral authentication to a pre-defined leading element with a high level of security and which is in particular usable in restrictive environments with restricted characteristics of the elements of the group.

According to the invention, the problem mentioned above is solved by the characteristics of claim 1. According to this, such a method is characterized in that the leading element D sends an authentication request to the elements of the group $N_i$ wherein the request for authentication for all the group elements $N_i$, where i=1, . . . , m, is the same and wherein the group elements $N_i$—based on the request for authentication—send each an authentication response to the leading element D with the authentication responses being different for each group element $N_i$.

According to the invention, it has first been recognized that the data volume, which is necessary for a secure authentication of the group elements with regard to a leading element and which is to be transported via the network, can be significantly reduced—compared to common authentication processes—if the leading element sends out the same authentication request to all of the group elements. On the basis of this shared group authentication request, the group elements send authentication responses to the leading element which are individual and unique for all the group elements. By doing so, a high level of security is achieved.

The method, according to the invention which enables a pairwise and unilateral authentication of group elements with respect to a leading element, can be used in almost every group communication scenario. Examples of application of particular interest are for example the authenticated data collection in wireless ad hoc- or sensor networks or an authenticated cluster head election for routing purposes or for other network management tasks. Even in an environment which is highly restricted in available bandwidth, CPU, storage capacities etc., the method according to the invention is applicable without decreasing the level of security.

In an especially beneficial manner, a synchronization of the authentication process can be provided. By such synchronization, during which all the group elements send their authentication response to an authentication request of the leading element before the leading element sends the next consequent authentication request, a further enhancement in efficiency, as well as a minimization of energy and amount of data needed for authentication, can be achieved. Concretely, a time-synchronized authentication or an event-synchronized authentication, relating for example to the transmission of measured data, can be provided.

A further reduction of transmitted data can be provided if the leading element sends the authentication request together with a service request (SREQ) to the group elements. A service request can, for example, include the request to the group elements of a sensor network to transmit the current measured values to the leading element. Furthermore, it can be provided that the authentication responses are sent along with a service response (SRES) to the leading element. Due to such a binding of the authentication process to the actual communication between the single group elements and the leading element, for example as transmission of measured data, any further message can be set aside.

Regarding an especially high level of security of authentication, it can be provided that the authentication request comprises a shared challenge, i.e. in other words a "group challenge", which is designed in such a way that every group element gets a different result when solving the problem.

Within the framework of a concrete implementation, an initialization phase can be provided which precedes a first authentication request. Within the framework of this initialization phase, first of all a hash function is defined. Hash functions are characterized as being one-way functions such that they are easy to compute but (almost) irreversible. In other words, there is no efficiently computable inverse function to a hash function allowing to find the corresponding source value to a given target value. Furthermore, it is also almost impossible to find two source values resulting in the same hash value (collision-free). In addition to defining an individual common hash function, every group element chooses a secret key and defines a number of iterations. On the basis of its element-specific key, every group element then computes a hash chain corresponding to its defined number of iterations. A hash chain is an iterative application of a hash function on one value. The last value of the hash chain as well as the number of the performed iterations are revealed to the leading element and stored by the latter.

Regarding the authentication request and the relating "challenge", it can be provided that the leading element defines an integer j and that it sends this integer as shared challenge to all the group members. The value of j is chosen to be smaller than the smallest number of iterations defined by one of the group elements for its hash chain during the initialization phase. The solution for the challenge can be that each group element executes the hash function j-time on its key and sends the out-coming result of this as authentication response to the leading element.

After all, the leading element can compute the hash function on every group element as often as necessary to compare the received value with the final values of the hash chains which were stored during the initialization phase. By doing this comparison, the leading element can then infer whether a group element is valid or not.

Depending on the number of group elements and the available storage space of the leading element, it can be advantageous if the leading element only receives a specific part of information of the respective last values of the hash chains transmitted during the initial phase and saves them. Such a part of information can for example comprise the first eight bits of a value by which the needed storage space can be reduced significantly. Especially for sensor networks such a reduction is extremely advantageous because the size of the payload is in general much smaller than the size of hash values which is for hash functions used efficiently in practice at least 64 bits. The capacities of the network can hence be mainly oriented towards the requirements needed for the payload and must not or at least not significantly be increased for the authentication process. As a principle, when defining the size of the part of information of the values to be stored, attention should be spent on the fact that the part of information is not so small it endangers the level of security of the algorithm.

Depending on the computing power and the available storage space of the group elements it can turn out to be advantageous that the group elements store at least some of the computed values of the hash chain. In this way it is possible to reduce enormously the time a group element needs for computing the solution to a challenge of an authentication request.

With every authentication request an integer j is selected as group challenge in an advantageous way, with the integer j being smaller than any integer j selected in any of the previous authentication requests. Concretely, the integer j could be diminished after every authentication request by the value of one. By this procedure it is avoided that a potential attacker can use information from a previous authentication process in order to feign the identity of one of the group elements during a later authentication process.

There are several ways how to design and further develop the teaching of the present invention in an advantageous way. For this purpose, it is to be referred to the subordinate patent claims on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained.

DESCRIPTION OF THE PREFERRED EMBODIMENTS

Figure 1:
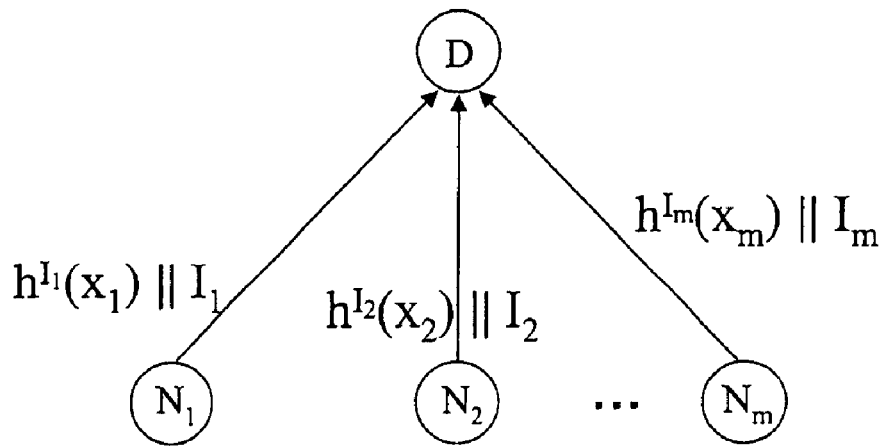
FIG. 1 shows schematically the initialization process in a group element authentication method according to an embodiment of the present invention.

Referring to FIG. 1, an initialization phase is illustrated which is previous to the actual authentication processes. The group shown comprises a leading element D as well as a total of m group elements $N_i$, where i=1, . . . , m, of which only three elements $N_1$, $N_2$ and $N_m$ are shown for reasons of clarity. It can be envisioned that the initialization takes place in a protected environment where potential attacks can be excluded. In case of wireless sensor networks, the initialization phase could be performed—in total or a part of it—before deploying the single sensor nodes.

During the initialization phase, the group elements $N_i$ first agree on a shared hash function h( ). Moreover, every group element $N_i$, with i=1, . . . , m, defines a secret key $x_i$ only known by the group element itself. The keys $x_i$ can be for example a random number generated by the group elements $N_i$. On the basis of the secret key $x_i$ every group element $N_i$ computes a hash chain by executing the hash function iteratively, i.e. a hash function is once more executed on the result of a first execution of the hash function on the secret key $x_i$ and this process is performed for a specific number $I_i$ of iterations. The number $I_i$ is also individually defined by the group elements $N_i$. The last value of the hash chain $h^{I_i}(x_i)$ as well as the number $I_i$ of iterations are disclosed to the leading element D and stored there locally. This is the end of the initialization phase and the actual authentication processes can start.

Figure 2:
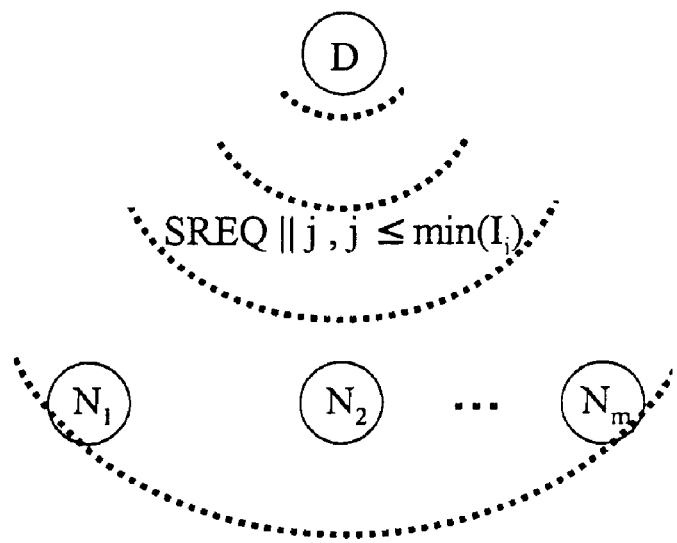
FIG. 2 shows schematically the sending of an authentication request to the group elements in the embodiment.

In FIG. 2, the first part of an authentication process for the group as according to FIG. 1 with the group elements $N_1$ to $N_m$ and the leading element D is illustrated. The leading element D sends a service request as a broadcast message to the group elements $N_i$, which is indicated by the dashed curves. The service request (SREQ) can for example be a request to the group elements $N_i$ to send currently measured data to the leading element D, in the case the group elements $N_i$ act as sensor nodes. Together with the service request, the leading element D broadcasts a group challenge to the group elements $N_i$. In the case of the group challenge, it is an integer j representing a number of iterations. The number j is selected in such a way that j≦min {$I_i$, i=1, . . . , m) applies, so it is assured that all the group elements $N_i$ have already executed j-times the iteration of the hash function when creating the hash chain during the initialization phase.

Figure 3:
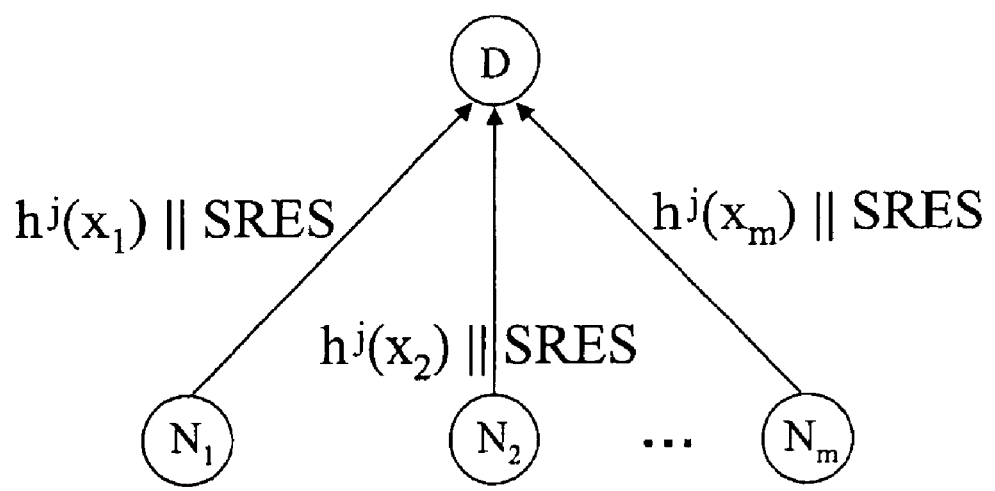
FIG. 3 shows schematically the sending of authentication responses to the leading element in the embodiment.

Finally, FIG. 3 shows how the authentication process during which the group elements $N_i$, where i=1, . . . , m, send their authentication response to the leading element D takes place. Corresponding to the challenge, every group element $N_i$ executes an iteration of j times of the hash function in order to compute the solution. It should be noted that only those group elements $N_i$ are enabled to do such a computation of the value $h^j(x_i)$ which know the secret key $x_i$ from the initialization phase.

Individually, for each group element $N_i$, the leading element finally can apply the hash function as often as necessary, i.e. concretely $(I_i-j)$ times, and so compare the computed value with the value as stored during the initialization phase. If both values match, the authentication was successful and the leading element D will accept the corresponding group element $N_i$ as authorized group element. If the two values differ it can be inferred that an unauthorized attacker tries to pose as a corresponding group element $N_i$ in order to get unauthorized access to the group.

Finally, it is particularly important to point out that the example of an embodiment described above only serves as an illustration of the teaching as according to the invention, but that it does by no means restrict the latter to the given example of an embodiment.

The invention claimed is:

1. A method for authentication of elements of a group, wherein the group has a hardware leading element with which each of the group elements can exchange information and wherein the authentication of the group elements takes place with regard to the leading element, the method comprising:

the leading element broadcasting an authentication request together with a service request (SREQ) to all the group elements, wherein the authentication request is the same for all the group elements; and the group elements each sending authentication responses to the leading element based on the authentication request in such a way that the leading element receives a time-synchronized or event-synchronized authentication of all the group elements, wherein the authentication responses are different for each group element, wherein during an initialization phase before a first authentication request, a shared hash function h( ) is defined, each group element $N_i$, with i=1, . . . , m, defines a secret key $x_i$ and a number of iterations $I_i$, each group element $N_i$ applies the hash function h( ) $I_i$-times to the key $x_i$ in order to compute the value of $n_i = h^{I_i}(x_i)$, the group elements $N_i$ reveal the computed values $n_i$ together with the values $I_i$ to the leading element, and the leading element stores the computed values of $n_i$ and $I_i$, and wherein the leading element defines an integer j with j being smaller than the smallest number of iterations $I_i$, where i=1, . . . , m, defined by one of the group elements $N_i$ during the initialization phase, the leading element sends the integer j as a shared group challenge to all the group elements $N_i$, every group element $N_i$, with i=1, . . . , m, applies the hash function h( ) j-times to its key $x_i$ in order to compute the solution $ni^* = h^j(x_i)$, and each group element $N_i$ sends the computed solution $n_i^*$ as authentication response to the leading element (D).

2. The method according to claim 1, wherein the authentication responses are sent together with a service response (SRES) to the leading element.

3. The method according to claim 1, wherein the authentication request comprises a shared task that is a challenge for all the group elements for which each group element provides a different result.

4. The method according to claim 1, wherein the leading element applies the hash function h( ) $(I_i-j)$-times to the received solutions $ni^*$ in order to compute the value $n_i' = h^{(I_i-j)}(n_i^*)$ and compares the computed values $n_i'$ with the stored values $n_i$.

5. The method according to claim 1, wherein the leading element only stores pre-configurable parts of information of the values $n_i$, where i=1, . . . , m, received from the group elements $N_i$.

6. The method according to claim 1, wherein the group elements $N_i$, with i=1, . . . , m, store at least some of the values of the hash function.

7. The method according to claim 1, wherein for each said authentication request an integer j is selected which is smaller than any integer j selected for any of the previous said authentication requests.

8. The method according to claim 7, wherein the integer j is diminished by the value of 1 or more after each authentication request.

9. The method according to claim 1, wherein the group elements are sensor nodes in a wireless sensor network.

* * * * *